W. H. WOCHNER.
DETACHABLE AUTOMOBILE BODY.
APPLICATION FILED NOV. 6, 1917.
1,270,086.
Patented June 18, 1918.
2 SHEETS—SHEET 2.
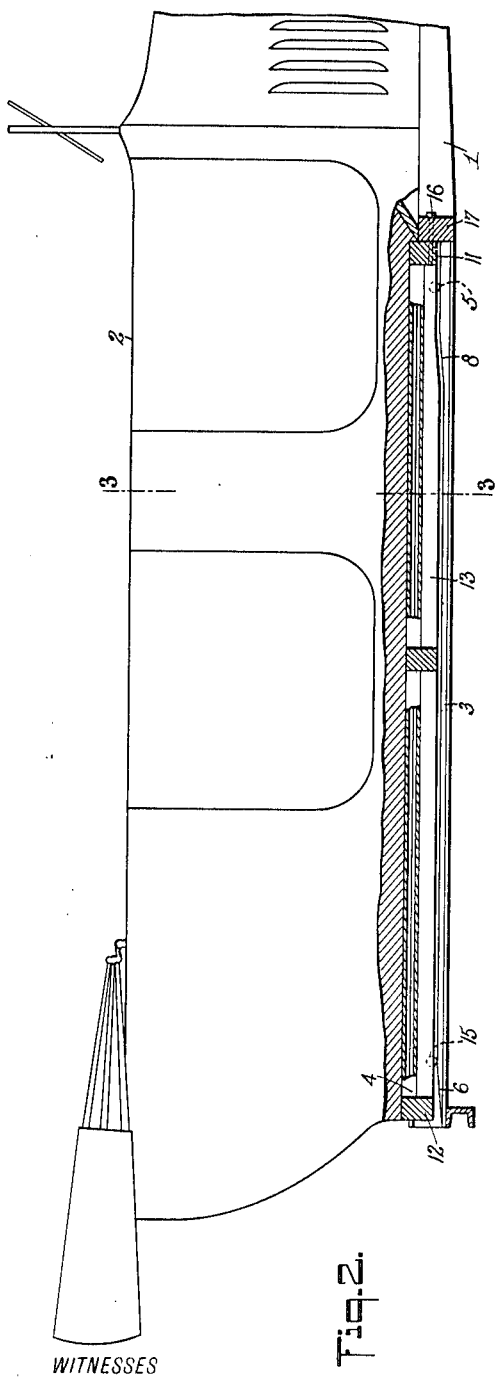
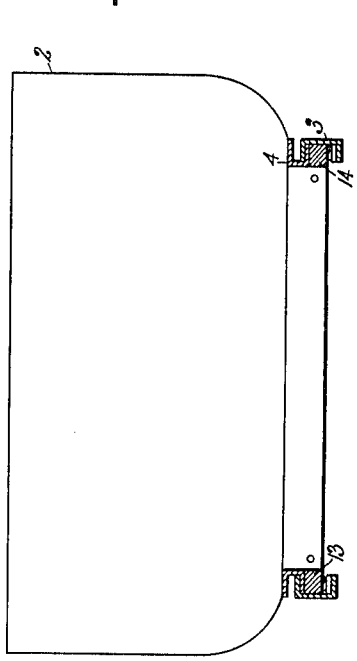
WITNESSES
INVENTOR
W. H. Wochner
BY
ATTORNEYS

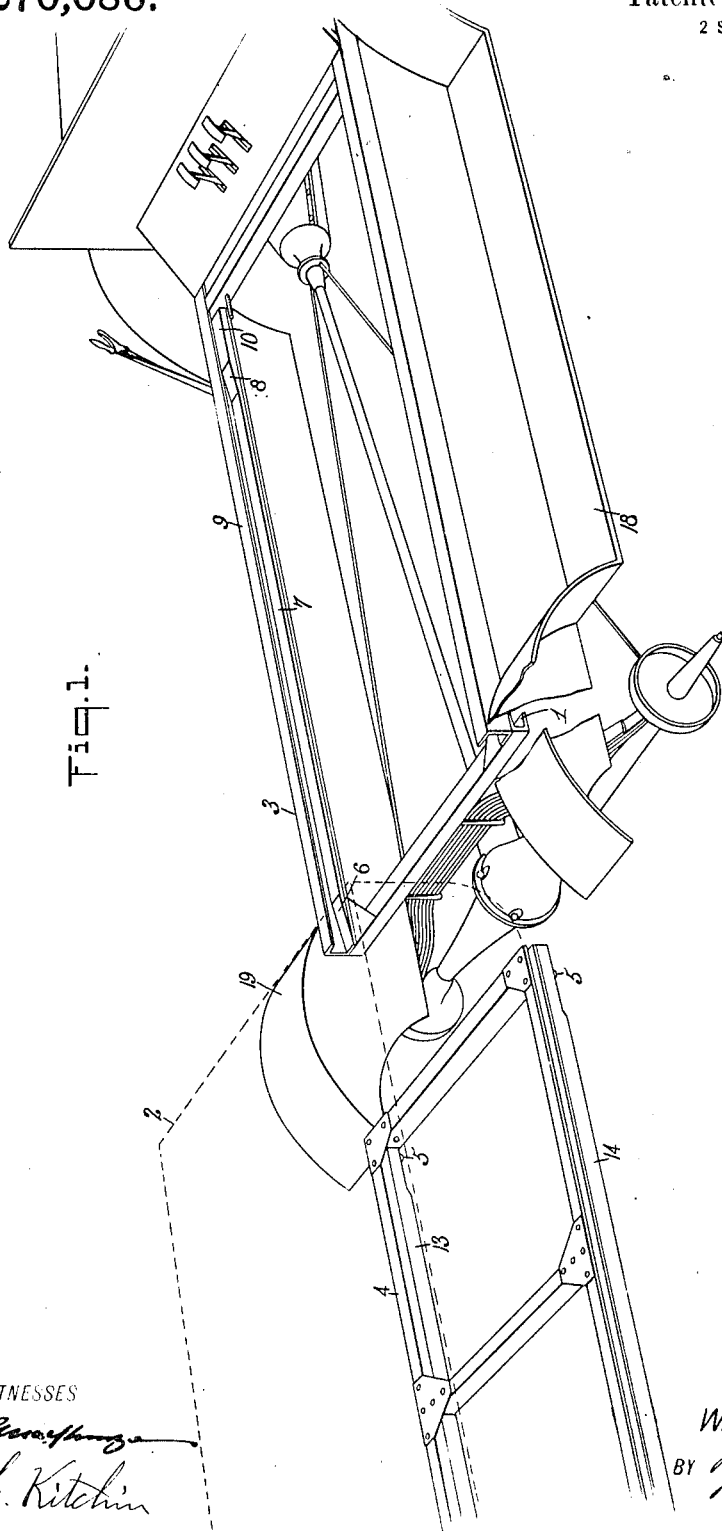

UNITED STATES PATENT OFFICE.

WILLIAM HENRY WOCHNER, OF FALLS CITY, NEBRASKA.

DETACHABLE AUTOMOBILE-BODY.

1,270,086.  Specification of Letters Patent.  Patented June 18, 1918.

Application filed November 6, 1917. Serial No. 200,531.

*To all whom it may concern:*

Be it known that I, WILLIAM H. WOCHNER, a citizen of the United States, and a resident of Falls City, in the county of Richardson and State of Nebraska, have invented a new and Improved Detachable Automobile-Body, of which the following is a full, clear, and exact description.

This invention relates to automobiles and particularly to an improved arrangement whereby the body may be quickly applied or removed, and has for an object the provision of a simplified construction which may be formed as part of the automobile, or which may be made independent of the automobile and attached thereto in such a manner that the body may be quickly applied or removed with a minimum effort.

Another object of the invention is the provision of frames forming a runway, one of which is mounted on the running gear or chassis of the automobile and the other on the body of the automobile, whereby the body may be slidingly fitted into position or slidingly removed.

In the accompanying drawings:

Figure 1 is a perspective view showing part of an automobile with an embodiment of the invention applied thereto.

Fig. 2 is a longitudinal vertical section through the upper part of an automobile showing certain features of the invention.

Fig. 3 is a transverse sectional view through Fig. 2 on line 3—3.

Referring to the accompanying drawings by numerals, 1 indicates the usual chassis of an automobile and 2 the usual body. The ordinary automobile now in use is arranged so that the body 2 may be applied and removed whenever necessary, but requires considerable work in attaching and disconnecting the same, while requiring an appreciable power to lift the body into position. In order to obviate any lifting or excess of power in applying or removing the body a pair of frames 3 and 4 are provided, frame 3 being connected rigidly by bolts or otherwise to the chassis, while frame 4 is connected rigidly in any suitable manner to the body 2. These frames are designed to telescope, or one slide through the other as shown particularly in Figs. 2 and 3. When the frame 4 moves from the position shown in Fig. 1 to that shown in Fig. 2, the rollers or anti-friction members 5 at the front engage the inclined ways 6 and then pass along the horizontal guide 7 until the rollers 5 strike the inclined ways 8 which causes the lower part of the frame 4 to press against the upper part or section 9 of frame 3 as the rollers pass on to the horizontal section 10. It will be noted that the frame 3 consists of two side channel irons while the frame 4 consists of two side channel irons, front and rear bars 11 and 12 and side bars 13 and 14 as shown in Fig. 3. If desired these side bars could be eliminated and proper supports provided for the rollers 5 and also the rollers or anti-friction members 15 at the rear of frame 3. After the parts have been moved forwardly from the position shown in Fig. 1 to that shown in Fig. 2 the frame 4 and parts carried thereby are locked in position by one or more screws 16 which extend through the cross bar 17 of the chassis 1 and into the cross bar 11. It is of course evident that other screws or bolts could be used for locking the parts against removal though ordinarily the use of screws 16 is sufficient. When it is desired to remove the body these screws are removed or disconnected from bar 11 and then the body pushed to the rear. In repair garages and other places it is aimed to have a shelf of substantially the same height as the frame 3 so that as the body is forced from the frame 3 it will pass on to the shelf where it is in position for again being placed on the frame 3 for continued use. A sliding forward movement or a sliding rearward movement is all that is necessary to apply or remove the body. It is of course evident that the body could be removed without providing the shelf above mentioned, but in this case some support must be provided as the body is removed or as the chassis is removed from beneath the body. Preferably when providing the frames 3 and 4 as just described the running boards, and mud guards 18 and 19 are applied to the chassis or to the frame 3 in any suitable manner as indicated in Fig. 1.

What I claim is:

1. In a device of the character described, a frame adapted to be mounted on the chassis of an automobile, said frame having channel irons on the sides, each of said side channel irons having a bottom section with an inclined portion in the rear and an inclined portion near the front, said inclined portions extending substantially in parallel planes at different levels, a second frame adapted to be connected with the bottom of an automobile body, and means arranged on said second mentioned frame adapted to engage said inclined portions for pressing said frame against the upper part of said side frames when said frames are in position on a chassis, and means for locking said second frame against accidental disengagement.

2. In a device of the character described, the combination of a chassis of an automobile with a frame rigidly secured thereto and having a pair of substantially U-shaped channel irons on the side facing each other and a transverse bar at the front, each of said channel irons having an inclined portion near the front and an inclined portion near the rear whereby elevating platforms are produced, a frame having side channel irons adapted to be connected to an automobile body, anti-friction members connected to said side channel irons near the front and near the rear whereby when said last mentioned frame is telescoped over the first mentioned frame said anti-friction means will pass up said inclined ways and will rest upon the respective elevated planes for pressing the lower part of the second mentioned frame against the upper part of the first mentioned frame, and locking means for holding said second mentioned frame interlocked with said first mentioned frame.

3. In a device of the character described, a pair of channel guide members adapted to be connected to the chassis of an automobile, a pair of channel guide members adapted to be connected with the body of said automobile, a guide connected with each of said last mentioned channel irons, said guide and one leg of the last mentioned channel irons being capable of telescoping into the first mentioned channel irons, means for causing the second mentioned channel irons to press against the upper part of the first mentioned channel irons, and a locking screw for locking the second mentioned channel irons in engagement with the first mentioned channel irons, whereby said body is locked on said chassis.

WILLIAM HENRY WOCHNER.